Oct. 25, 1938.    B. M. OSWELL    2,134,261
SPLASH GUARD FOR ELECTRIC MIXING MACHINES
Filed Oct. 4, 1937
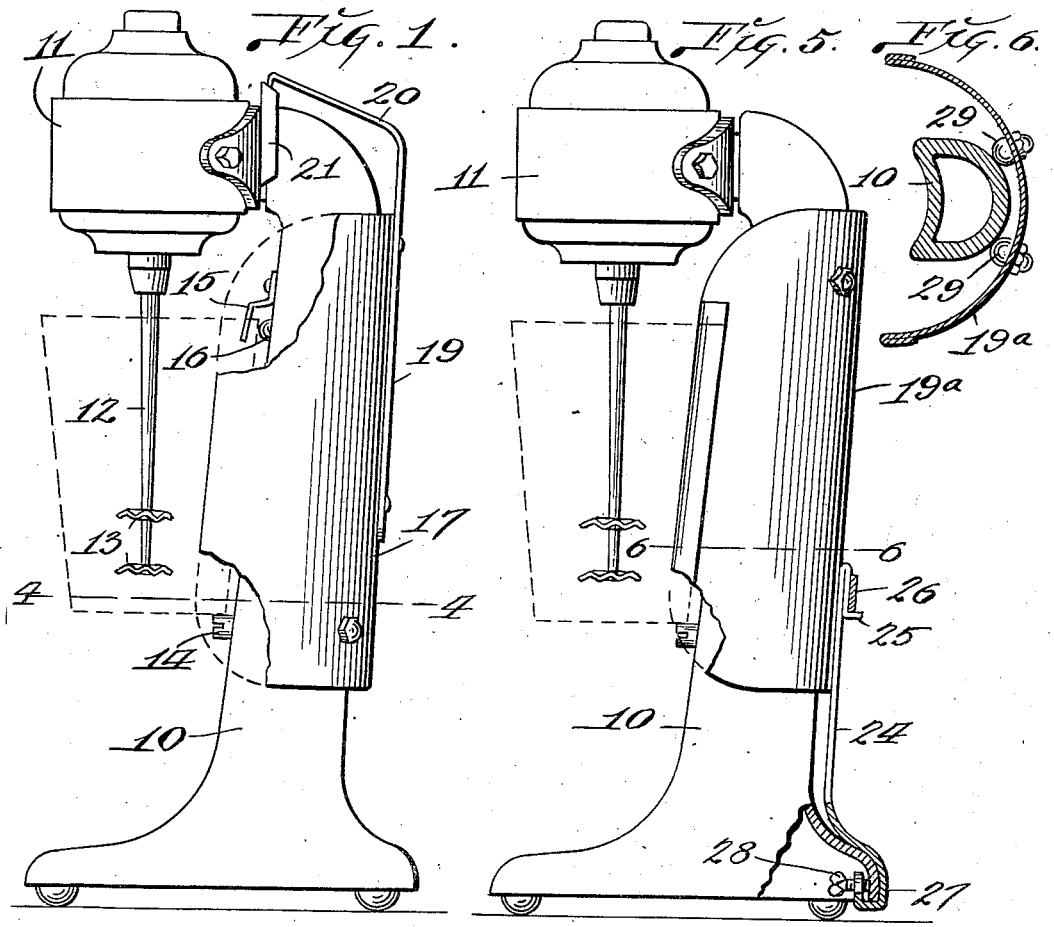
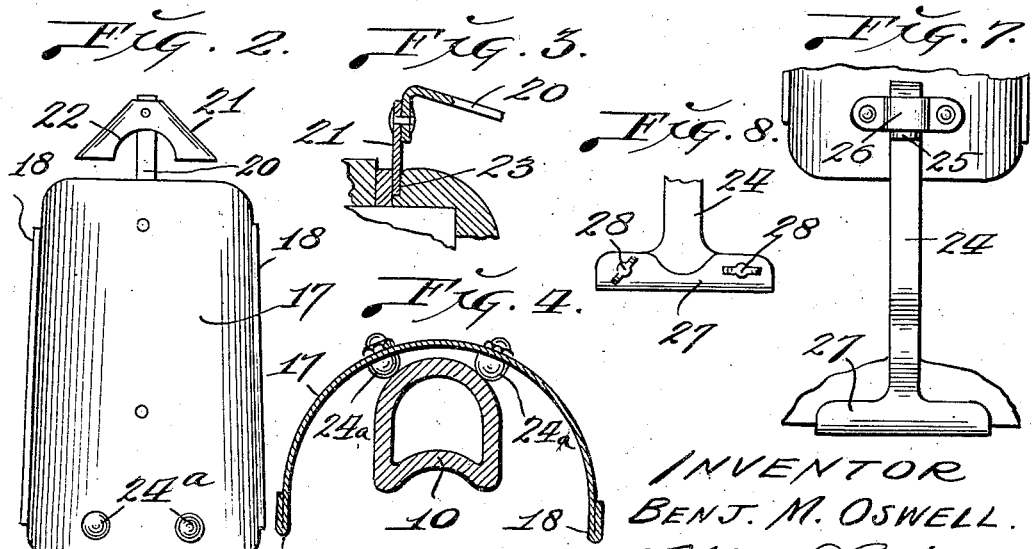
INVENTOR
BENJ. M. OSWELL.

Patented Oct. 25, 1938

2,134,261

UNITED STATES PATENT OFFICE 2,134,261

SPLASH GUARD FOR ELECTRIC MIXING MACHINES

Benjamin M. Oswell, Los Angeles, Calif.

Application October 4, 1937, Serial No. 167,185

2 Claims. (Cl. 259—1)

My invention relates to a splash guard particularly designed for use on electrically operated mixing machines, and particularly those machines that are utilized in cafes, soda fountains and the like, for mixing beverages such as malted milk.

The principal object of my invention is to provide a splash guard that is relatively simple in construction, inexpensive of manufacture, capable of being easily and quickly applied to or removed from the conventional forms of electric mixing machines and which splash guard, when installed on the mixing machine, presents a finished and pleasing appearance.

The conventional forms of mixing machines now generally used comprise a base from which rises a substantially vertical standard from 12 to 18 inches in height, with an electric motor supported at the top of the standard, said motor carrying a depending stirring arm which, as the motor is operated, rotates within a glass or like receptacle that is supported on the front face of the standard.

It is one of the principal objects of my invention to provide a splash guard that is substantially channel-shaped in horizontal section, and which is supported immediately to the rear of the standard so as to effectively prevent splashing of the beverage that is being mixed, rearwardly against the wall or equipment that is positioned immediately to the rear and sides of the standard upon which the guard is mounted.

A further object of my invention is to provide a splash guard having cushioning means that engages the standard of the mixing machine so as to eliminate all noise that might otherwise develop as a result of the vibration imparted to the standard of the mixing machine, while the electric motor is in operation.

A further object of my invention is to provide a splash guard that may be readily removed from the mixing machine for the purpose of being cleansed, sterilized and polished.

With the foregoing and other objects in view, my invention consists in certain novel features of construction and arrangements of parts that will be hereinafter more fully described and claimed, and illustrated in the accompanying drawing in which:

Fig. 1 is a side elevational view of a conventional electric mixer, and showing my improved splash guard applied thereto.

Fig. 2 is a front elevational view of the splash guard.

Fig. 3 is a detail section showing the connection between the hook on the upper end of the splash guard and the upper portion of the standard of the electric mixer.

Fig. 4 is a horizontal section taken on the line 4—4 of Fig. 1.

Fig. 5 is a side elevational view of a mixing machine, and showing a modified form of the splash guard.

Fig. 6 is a horizontal section taken on the line 6—6 of Fig. 5.

Fig. 7 is a rear elevational view of the bracket that supports the form of splash guard illustrated in Fig. 5.

Fig. 8 is an elevational view looking at the inner side of the lower portion of the bracket seen in Fig. 7.

Referring by numerals to the accompanying drawing which illustrates a preferred embodiment of my invention, and particularly to the construction illustrated in Figs. 1 to 4 inclusive, 10 designates the standard of a conventional electric mixing machine utilized at soda fountains and the like, for mixing various beverages, including malted milk, said standard carrying at its upper end a small electric motor 11, and depending from the shaft of the motor is a stem 12, carrying on its lower portions one or more mixing discs 13.

The standard 10 is provided with the usual support 14 for the container of the liquid or liquids to be mixed, and the upper edge of said container being engaged behind a hook 15 and the latter overlying a switch 16 that closes the circuit to the motor, as the beverage container is positioned upon the support 14 with its edge behind hook 15.

The splash guard contemplated by my invention comprises a shield 17 formed from thin sheet material, preferably metal, bent so that it is approximately semi-circular in horizontal section, and having its vertical edges rebent, as designated by 18, to form beads. This shield may be finished as desired, although I prefer to form the same with smooth chrome plate surfaces.

When properly applied to the mixing machine, the shield occupies a position directly behind the upper portion of the standard 10, and thus provides an effective guard to prevent the liquid from splashing from the receptacle positioned on the mixing machine, against the wall immediately to the rear of the mixing machine.

Secured to the rear surface of the central portion of the shield 17 is a vertically disposed strap 19, preferably of metal, the upper portion of which is bent forwardly to form an arm 20 that lies just above the upper end of the standard 10 and to the rear of the motor 11.

Suitably secured to the forward end of arm 20 is a vertically disposed plate 21, in the lower central portion of which is formed a substantially semi-circular notch 22, and when the splash guard or shield 17 is positioned upon the mixing machine, the edge of plate 21 around the notch 22 fits snugly in the slot 23 that is formed between the upper end of the standard 10 and the bracket that carries the motor 11. (See Fig. 3.)

Secured to and projecting from the lower portion of the inner face of the shield 17 are two cushioning members 24, preferably formed of rubber, and which, when the shield is properly applied to the mixing machine, bear on the rear portion of standard 10, thus eliminating any rattling noise that might otherwise develop as a result of vibration in the mixing machine, while the motor is in operation. (See Fig. 4.)

In the construction illustrated in Figs. 5 to 8 inclusive, the shield 19a is practically identical with the shield 17, previously described, but instead of using a hook to connect the upper end of said shield with the top of the standard 19 of the mixing machine, a bracket that is secured to the base of the standard supports said shield.

This bracket comprises a narrow vertically disposed strip or band 24 of metal, the upper portion of which is bent double, and the end of the piece of metal just below the doubled portion is bent outwardly at right angles, to form a lip 25.

The doubled portion of this bracket is removably inserted in a central portion of a strap 26 that is suitably secured to the lower portion of the shield 19a on the outer face thereof, and when the parts are properly assembled, the lower edge of strap 26 rests on lip 25. (See Fig. 5.)

The lower portion of strip 24 is bent outwardly and thence downwardly, to conform to the shape of the rear portion of the base of the standard, and the rear end of said strip terminates in a member 27 that is U-shaped in cross section and which is applied to the lower portion of the rear wall of the base.

Screw-seated in the end portions of the inner wall of the U-shaped member 27 are set screws 28, which, when tightened, bear against the wall of the base of the standard, thereby firmly clamping the supporting bracket 24 to said standard.

In this form of shield, a pair of cushions 29, preferably of rubber, are secured to the upper portion of the shield on the inner face thereof, and these cushions bear against the upper portion of standard 10 to prevent rattling of the shield, while the motor of the mixing machine is in operation.

In both forms of the shield or splash guard, the members 17 and 19a are positioned to the rear of the container in which the beverages are mixed, and thus it is impossible for any of the liquid within the container that is positioned upon the mixing machine to splash or be thrown rearwardly from the mixer.

In both forms of the device, the shield members may be easily and quickly removed from the mixing machine for the purposes of being cleansed, sterilized and polished.

Electric mixing machines of the type with which my improved shields are associated are generally positioned on a service shelf that projects outwardly from the wall to the rear of the counter upon which beverages and foodstuffs are served. It frequently happens that the wall to the rear of the mixing machines includes ornamental panels, mirrors and the like, and further, it is the general practice to store clean glasses and other utensils on the shelf to the rear of the mixing machines, and which glasses and utensils are used in serving beverages and the like.

By arranging the shields on the standards directly to the rear of the containers in which the beverages are mixed, the wall or furnishings, likewise glasses and other utensils that may be positioned on the shelf to the rear of the mixing machines are effectively protected against splashing of any portion of the contents of the glasses positioned on the standards of the mixing machines during beverage-mixing operations.

Thus it will be seen that I have provided a shield or splash guard for electric mixing machines that is relatively simple in construction, inexpensive of manufacture and very effective in performing the functions for which it is intended.

It will be understood that minor changes in the size, form and construction of the various parts of my improved splash guard for electric mixing machines may be made and substituted for those herein shown and described without departing from the spirit of my invention, the scope of which is set forth in the appended claims.

I claim as my invention:

1. In the combination of a splash guard and a mixing machine, a curved shield having a cavity adapted to receive a portion of the machine, a securing means fixed to the convexed side of the shield, a supporting strip having an end adapted to snugly fit said means and support the shield, another end of the strip having a portion bent and which is provided with means to fasten it to an edge of the mixing machine, the concaved portion of the shield having resilient shock absorbers adapted to bear against a portion of the machine to avoid metallic contact between the shield and portions of the machine.

2. In a mixing machine having a splash guard, a base having a standard extending therefrom to support working parts of the machine, a curved shield partly enveloping a portion of the standard, a supporting strip removably fastened to the base and removably attached to a lower end of the shield so that the shield can be released without removing the strip, rubber buttons fixed at spaced parts in the upper portion of the shield to space it from the standard and prevent metallic noise due to vibration.

BENJAMIN M. OSWELL.